United States Patent

[11] 3,575,650

| [72] | Inventor | Werner H. Fengler<br>23651 Fordson Drive, Dearborn, Mich.<br>48124 |
|---|---|---|
| [21] | Appl. No. | 1,439 |
| [22] | Filed | Jan. 8, 1970<br>Division of Ser. No. 564,975 July 13, 1966,<br>Pat. No. 3,512,065 |
| [45] | Patented | Apr. 20, 1971 |

[54] LINEAR HIGH-TORQUE ELECTRIC STEPPING MOTOR SYSTEM
5 Claims, 24 Drawing Figs.

| [52] | U.S. Cl. | 318/135, 310/12 |
|---|---|---|
| [51] | Int. Cl. | H02k 41/02 |
| [50] | Field of Search | 310/12–14, 49; 318/135, 130 |

[56] References Cited
UNITED STATES PATENTS

| 3,136,934 | 6/1964 | Henry-Baudot | 318/130 |
|---|---|---|---|
| 3,225,228 | 12/1965 | Roshala | 310/12 |
| 3,441,819 | 4/1969 | Palmero | 310/49X |
| 3,457,482 | 7/1969 | Sawyer | 318/135X |

*Primary Examiner*—D. F. Duggan
*Attorney*—Barthel and Bugbee

ABSTRACT: This linear high-torque electric stepping motor system includes a linearly movable armature with pole pieces either consisting of permanent magnets or wound double-headed transverse pole pieces registering with and overlapping the heads of pole pieces of alternate opposite polarities in a pair of stators disposed on opposite sides of the linearly movable armature.

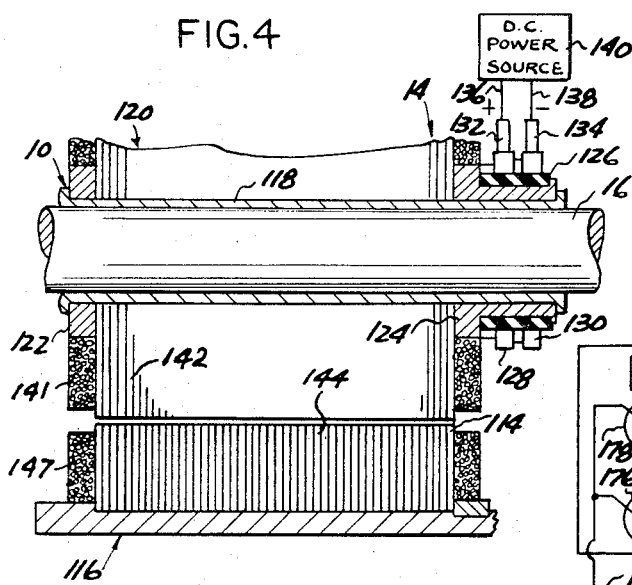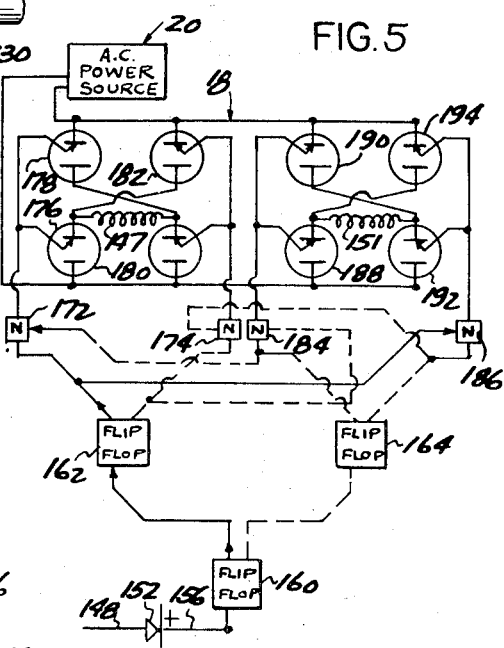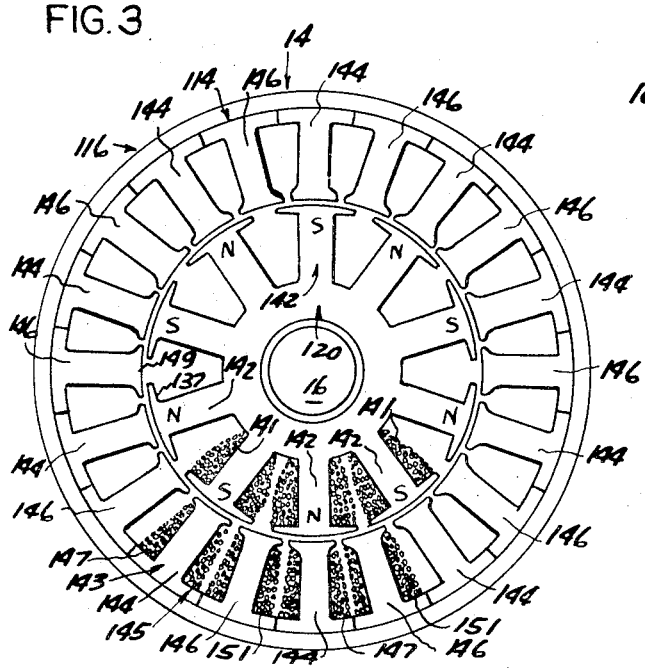

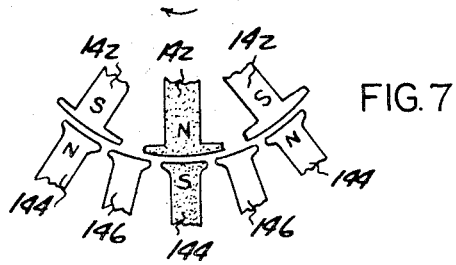
FIG. 7
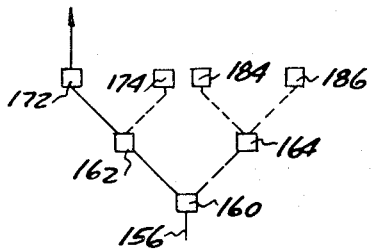
FIG. 6
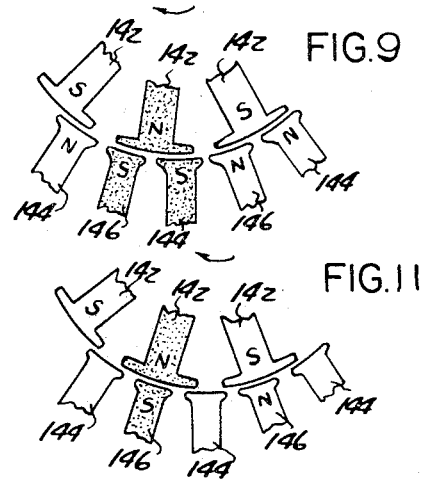
FIG. 9
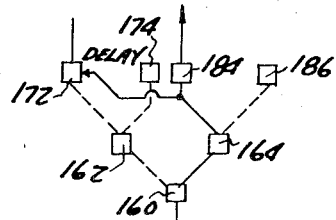
FIG. 8
FIG. 11
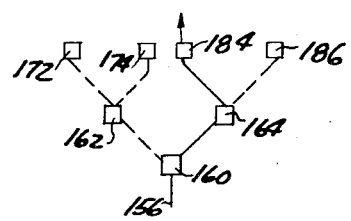
FIG. 10
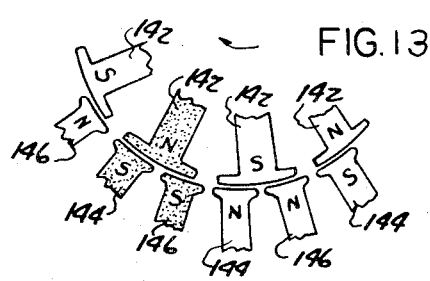
FIG. 13
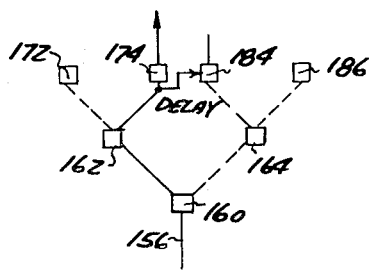
FIG. 12
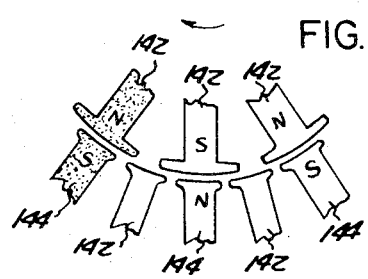
FIG. 15
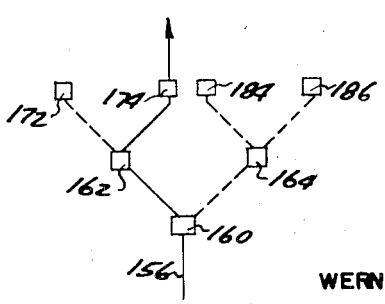
FIG. 14
INVENTOR
WERNER H. FENGLER
BY Barthel & Bugbee
ATTORNEYS

INVENTOR
WERNER H. FENGLER

BY Barthel & Bugbee
ATTORNEYS

INVENTOR
WERNER H. FENGLER
BY Barthel & Bugbee
ATTORNEYS 3,575,650

LINEAR HIGH-TORQUE ELECTRIC STEPPING MOTOR SYSTEM

The electrical circuitry operatively employed with this stepping motor is fully described in the specification and shown in the drawings of my copending application hereof Ser. No. 564,975 filed July 13, 1966 for High-Torque Stepping-Motor-Driven Speed-Reducing Prime Mover now U.S. Pat. No. 3,512,065 issued May 12, 1970, of which this a division.

The linear stepping motor disclosed and claimed in the present divisional application, like the rotary stepping motor disclosed and claimed in my above-identified patent, is energized either by a pulse-controlled electric circuit supplying half-wave direct current source for unidirectional motor motion (FIGS. 5 to 21 and 24) or full-wave direct current therefrom for bidirectional motion (FIGS. 22 and 23). The radial rotary stepping motor (FIGS. 3 and 4) has a rotor with wound radial pole pieces connected to sliprings on the rotor shaft and terminating in widened heads, each capable of spanning a pair of heads of the radial pole pieces of a stator containing twice the number of pole pieces as the rotor and of alternate polarities. The half-wave stepping motor energization and control circuit (FIG. 5) alternately energizes both sets of windings of the oppositely wound alternate pole pieces of the stator with rectified half-wave electric current from an alternating current source to cause the rotor or movable linear armature, as the case may be, to rotate or move linearly step-by-step in one direction in response to electrical trigger pulses transmitted from a command device, such as a probe tracing a contoured surface, to a unidirectional energization and control circuit which contains silicon-controlled rectifiers, logic modules and flip-flop and which passes positive electric pulses but blocks negative electric pulses, so as to effect unidirectional step-by-step motions of the rotor or linear armature. To bring about bidirectional motion thereof, a memory or sequencing and inverter subcircuit (FIG. 23) is provided, together with an opposite-direction network including logic circuits necessary to reverse the motion of the rotor or linear armature in response to the reception of a negative electrical trigger pulse.

In the drawings:

FIG. 3 is a diagrammatic central vertical cross section through a stepping motor according to one form of the invention, with only three of the stator and rotor pole piece windings shown in order to simplify the disclosure, and showing the positions of the parts to which they have been moved in response to the action of the first signal or command pulse;

FIG. 4 is a central longitudinal section through the stepping motor shown in FIG. 3;

FIG. 5 is a block diagram of a pulse-controlled circuit half-wave direct current to selectively energize and control the stepping motor of FIGS. 3 and 4 from an alternating current power source for unidirectional rotation;

FIGS. 6, 8, 10, 12, 14, 16, 18 and 20 are simplified fragmentary block diagrams of the portions of the circuit of FIG. 5 which are energized by a succession of pulses to produce the relative locations of the rotor and stator in FIGS. 6, 8, 10, 12, 14, 16, 18 and 20 respectively;

Figure 22:
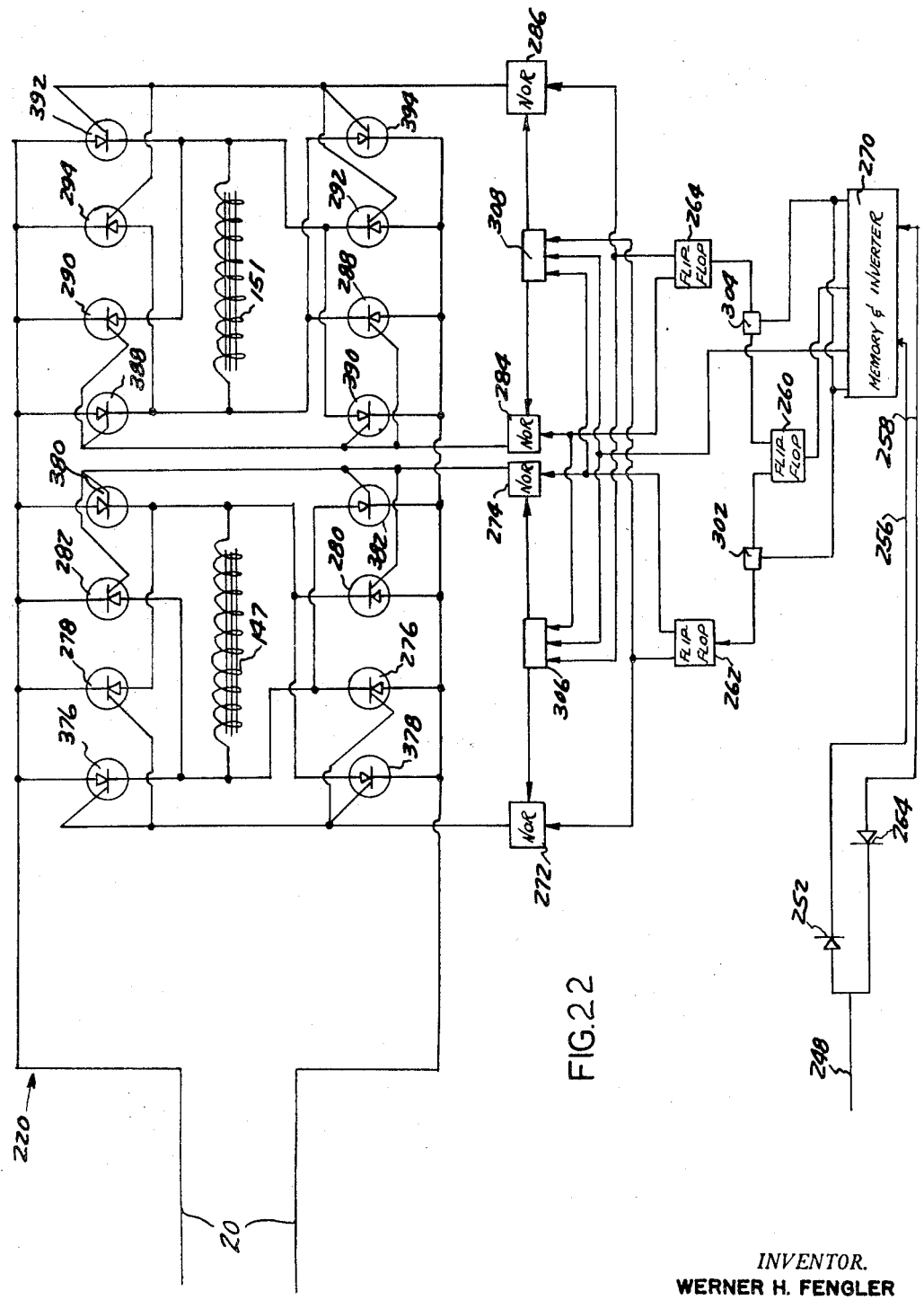
Figure 23:
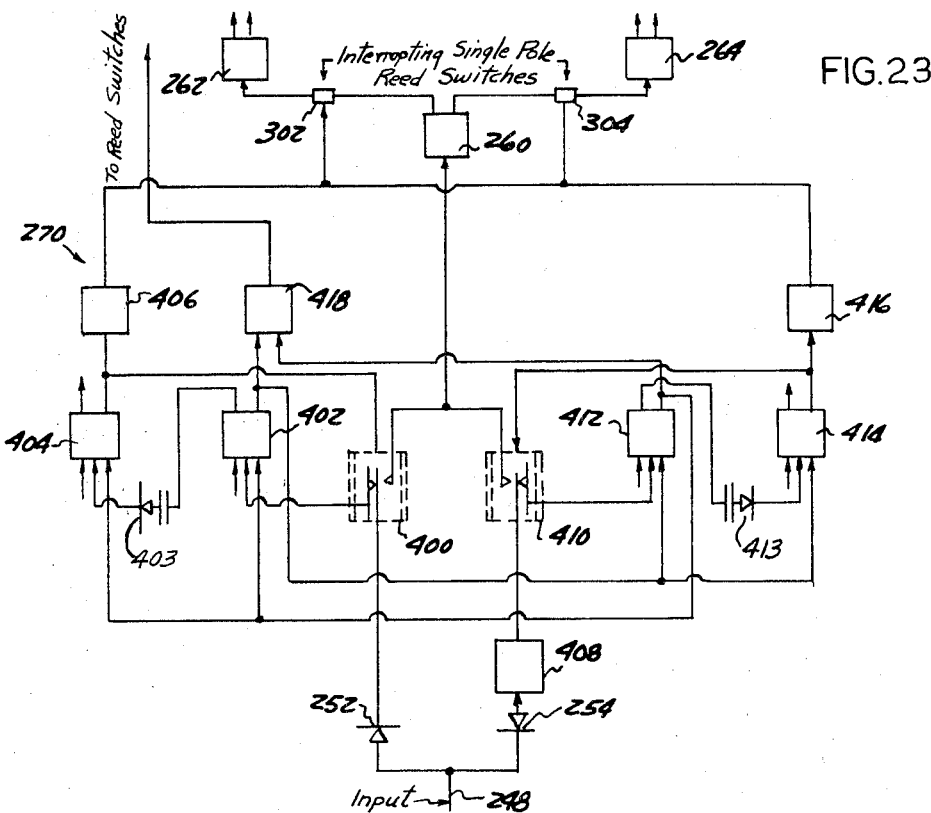
Figure 24:
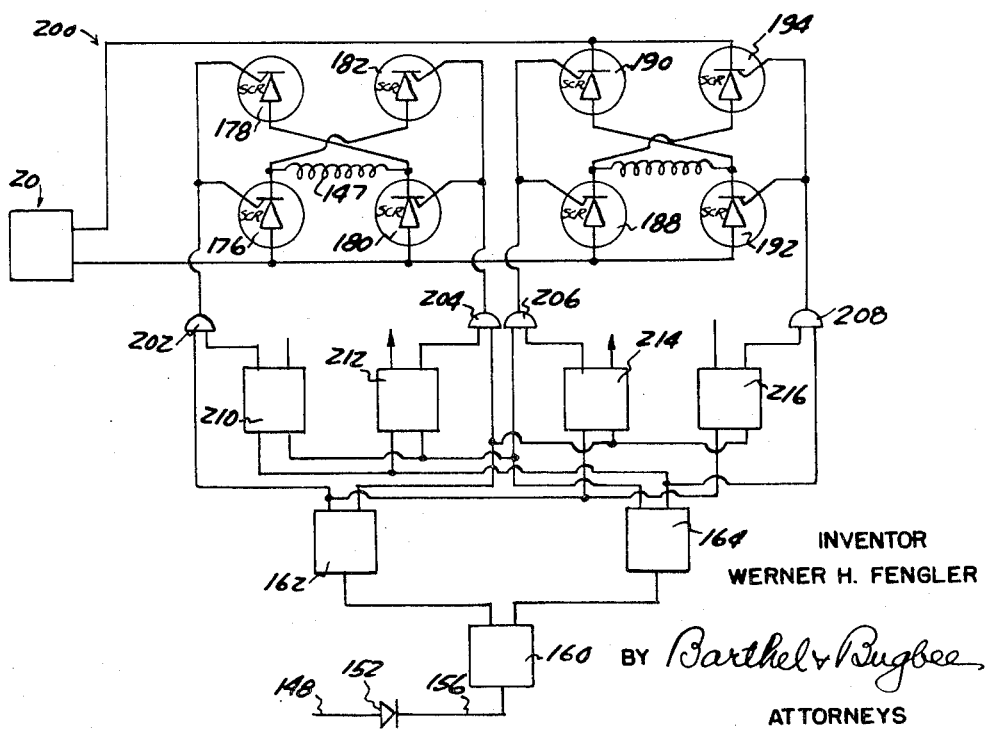

FIGS. 7, 9, 11, 13, 15, 17, 19 and 21 are fragmentary diagrammatic views of the successive relative positions of the rotor and stator poles of the stepping motor of FIGS. 3 and 4, in response to successive pulses energizing the different portions of the circuit of FIG. 5, as shown in FIGS. 6, 8, 10, 12, 14, 16, 18 and 20 respectively;

FIG. 22 is a block diagram of a pulse-controlled circuit supplying full-wave direct current to energize and control the stepping motor of FIGS. 3 and 4 from an alternating current power source for bidirectional rotation;

FIG. 23 is a block diagram of the sequencing and inverter subcircuit shown in FIG. 22; and FIG. 24 is a block diagram of a modification of the pulse-controlled half-wave unidirectional stepping motor energization and control circuit of FIG. 5, rearranged to employ "AND" logic modules.

Figure 1:
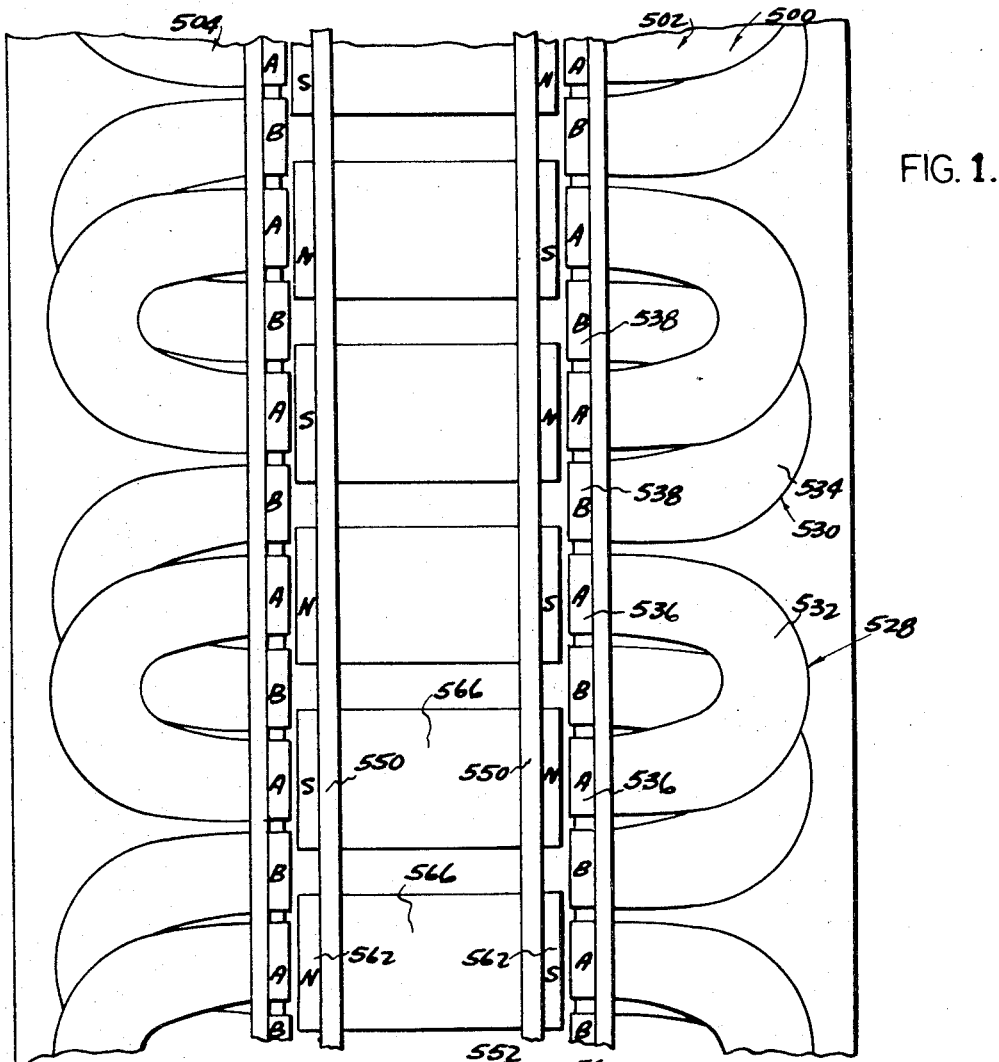
FIG. 1 is an end elevation of a linear high-torque electric stepping motor, according to one form of the present invention.
Figure 2:
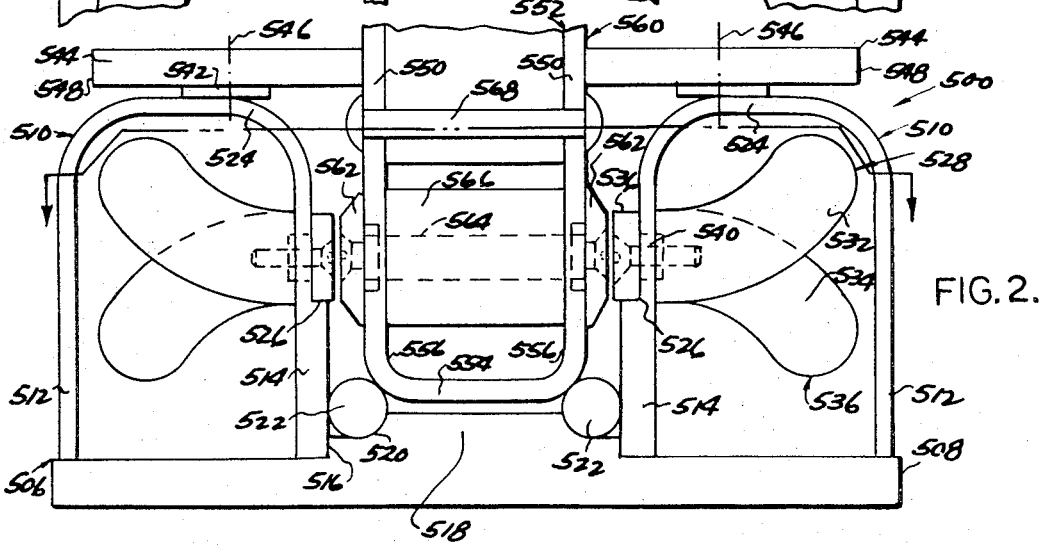
FIG. 2 is a horizontal section taken along the line 2-2 in FIG. 1, with the major components thereof shown in top plan view.

Referring to the drawing in detail, FIGS. 1 and 2 show a linear high-torque electric stepping motor, generally designated 500, according to one form of this invention. The linear stepping motor is so called because its stationary and movable pole pieces of its stators and armature respectively are disposed in linear paths with the armature movable in a linear path relatively to the stators. In particular, the linear stepping motor 500 includes a pair of laterally-spaced oppositely-facing stators 502 and 504 respectively mounted on an elongated base structure 506 including an elongated base plate 508 with inverted stationary channel members 510 secured to and rising from the base plate 508 in spaced parallel relationship to one another. The channel members 510 are of inverted U-shaped cross section with outer and inner sides 512 and 514 respectively with the lower ends of the inner sides 512 and 514 abutting a shoulder 516 on the base plate 508 formed by an upstanding elongated portion 518. The latter contain a pair of elongated ball races 520 of partially arcuate cross section configured for the linear travel of multiple bearing balls 522 which also abut and roll along the inner facing surfaces of the inner walls 514 of the channel members 510.

The outer and inner walls 512 and 514 are joined to one another by an upper wall 524. The lower portion of the inner wall 514 is sufficiently thicker than the upper portion thereof to form an elongated rabbet 526. The latter in effect serves as a shelf upon which rest two sets of horseshoe stator magnets 528 and 530 respectively. Each horseshoe stator magnet 528 or 530 consists of a U-shaped cored winding or coil 532 or 534, these being interlaced with one another in alternating sequence (FIG. 2), the windings 532 being bent upward and the windings 534 bent downward to avoid conflict with one another (FIG. 1). The horseshoe magnets 528 and 530 terminate in approximately square pole pieces 536 and 538 of opposite polarity in each pair and arranged side by side along the elongated shelf or rabbet 526 of each inner wall 514 of its respective channel member 510. The approximately square pole pieces 536 and 538 are bolted to their respective cores (not shown) of the cored windings 532 and 534 through insulating nonmagnetic inserts 540 (FIG. 1).

Secured to the upper walls 524 of the inverted channel members 510 (FIG. 1) are the stationary supports 542 of rotary antifriction bearing wheels 544 preferably mounted on ball bearings (not shown) to rotate around spaced parallel axes of rotation 546. The cylindrical peripheral guide surfaces 548 of the bearing wheels 544 bear against the outer surfaces of the spaced parallel sidewalls 550 of an upwardly facing elongated movable channel member 552 of approximately U-shaped cross section having a bottom wall 554 interconnecting the opposite sidewalls 550. The rounded corner or junction portions 556 engage the bearing balls 522 for effecting free sliding rectilinear motion of the channel member 552 guided by the antifriction bearing wheels 544, which are mounted at intervals along the top walls 524 of the inverted stationary channel members 510.

The movable channel member 552 constitutes the principal support or backbone of a linearly movable actuator or armature, generally designated 560. The sidewalls 550 immediately opposite the stator pole pieces 536 and 538 are drilled at longitudinally-spaced intervals for the positioning and securing of actuator pole pieces 562 disposed at the opposite ends of and bolted to cores 564 encircled by windings or coils 566 so wound that alternate pairs of pole pieces 562 are of alternate polarity when their windings 566 are energized with constant polarities or where permanent magnets are substituted for these electromagnets. The sidewalls 550 are receive at longitudinally-spaced intervals to receive rivetlike headed fasteners 568 by which the windings 566 are clamped between the sidewalls 550.

The energization of the stator windings 532 and 534 and the actuator or armature windings 566 may employ the same energization circuits as have been fully described in the specification and shown in FIGS. 9, 26 and 27 of the drawings of my copending parent application Ser. No. 564,975 filed July 13, 1966 for High-Torque Stepping-Motor-Driven Speed-Reducing Prime Mover, now U.S. Pat. No. 3,512,065, and repeated below, insofar as appears necessary for understanding. As disclosed therein, the sequence of energization is controlled by the timing of the pulses imparted to the input lines 148 or 248 of the respective circuits 18 or 200 of FIGS. 9 and 26 of my said patent. The mode of energizing the movable actuator or armature windings 566 will depend upon the nature of the installation. The stepping motor 500 of FIGS. 1 and 2 will be found useful, for example, in accelerating a train from a standing start up to its running speed, thereby enabling the reduction in size and power of the axle-connected electric motors ordinarily required for propulsion of such a vehicle. The coils 56y of the actuator or armature 560 secured to the frame in such an installation would be energized by a conventional direct current dynamo or generator (not shown) mounted on the frame and driven by a conventional prime mover. In the event, however, that the actuator or armature 560 is employed also to decelerate the train, the train will be equipped with a computer which senses the speed of the vehicle and times the application of the successive electric pulses in the proper sequence and periodicity to effect the deceleration and thereby relieve the braking equipment of the vehicle of much of its load.

If, on the other hand, the linear stepping motor 500 is employed, for example, in a conveyor installation, where it is impractical to mount a direct current generator and prime mover therefor upon the actuator or armature 560, energization of the actuator or armature windings or coils 566 would be effected by suitable brushed (not shown) engaging conductor bars mounted, for example, on the inverted channel members 510 in close proximity to the actuator or armature 560 upon which the brushes would be mounted.

The operation of the linear high torque stepping motor 500 of FIGS. 1 and 2 either from the unidirectional circuit of FIG. 9 of my said patent or from the bidirectional circuit of FIGS. 26 and 27 thereof is similar to that described in my said patent for the rotary stepping motors 14 and 420 of FIGS. 7 and 29 respectively of my said patent identified above except that the motion imparted thereby to the actuator or armature 560 is linear rather than rotary. In the particular example shown in FIGS. 1 and 2, the motion of the actuator or armature 560 is rectilinear, that is to say, in a straight-line direction.

From what has been said above, it will be seen that the present invention provides a high-torque electrical stepping motor wherein the startup and maximum continuous speed of its armature 560 in steps per minute is precisely tuned and supplied thereto. It will also be seen that this stepping motor develops a high holding or standing torque for "fail-safe" operation without the use of braking devices. Moreover, it will be evident to those skilled in this art that the present stepping motor permits an easy adjustment of the linear position of its armature 560 in relation to the zero point or starting point of machine tool components and to programmed signals on tape.

GENERAL DESCRIPTION OF CIRCUITRY

Referring to FIGS. 3 to 24 inclusive in general, FIGS. 3 and 4 show an improved high torque reversible stepping motor-driven power unit, generally designated 10, according to one form of the invention, as including an improved high-torque reversible stepping motor 14 having a rotary shaft 16 energized for unidirectional rotation by half-wave direct current received from a direct current stepping motor energization and control circuit 18, shown in FIG. 5, or for bidirectional rotation by a full-wave circuit 200 shown in FIG. 22. The energization and control circuit 18 in turn is energized from a suitable alternating current power supply source 20 (FIG. 5).

RADIAL HIGH-TORQUE STEPPING MOTOR

The radial high torque stepping motor 14 (FIGS. 3 and 4) so-called because its stator and rotor pole pieces are disposed in radially spaced relationship to one another, includes a stator 114 mounted on a frame or yoke 116 equipped with conventional antifriction bearings (not shown) which in turn rotatably support the shaft 16. Keyed or otherwise drivingly secured to the shaft 16 is a flanged sleeve 118 drivingly connected to and carrying a rotor 120. The rotor 120 is provided at one end with an end disc 122 and at its other end with a flanged bushing 124, both being drivingly connected to the flanged sleeve 118. The flanged bushing 124 carries an insulating bushing 126 drivingly connected thereto, and in turn carrying and drivingly connected to two axially-spaced electrically conducting slip rings 128 and 130 insulated from one another.

The slip rings 128 and 130 are in turn separately and slidably engaged by brushes 132 and 134 electrically connected by lines or conductors 136 and 138 to a source 140 of direct current which continuously energizes the windings 141 of a single set 130 of rotor pole pieces 142, the broad heads 137 of which, as will appear below, are sufficiently wide circumferentially to span the heads 149 of a pair of adjacent stator pole pieces. The windings 141 of alternate pole pieces 142 of the rotor 120 are wound oppositely to one another so as to produce alternate north and south poles of unvarying polarity in succession around the circumference of the rotor, as indicated by the letters N and S therein in FIG. 3. The rotor 120 may optionally be manufactured without windings, from sintered powdered iron or other magnetizable metal and with its pole pieces 142 permanently magnetized with the same alternate north and south polarity, in which case the slip rings and brushes are omitted.

The stator 114 has first and second sets 143 and 145 of T-section stator pole pieces 144 and 146 respectively also with circumferentially widened heads 149. The first set 143 has alternate windings 147 which are also wound oppositely to one another to produce alternate north and south poles in succession around the periphery of the stator 114. The second set 145 has alternate windings 151 which are also wound oppositely to one another to produce alternate north and south poles, as described below. Unlike the rotor pole pieces 142, the stator pole pieces 144 and 146 are of varying polarity during various stages of operation, according to in which direction of flow of current they are energized by the circuit 18, as explained below in the discussion of the operation thereof. The polarities of the rotor pole pieces 142 and of both sets of the stator pole pieces 144 and 146 alternate in sequence around the circumference of the rotor 120.

The stator 114 has twice the number of pole pieces 146 as the rotor 120, with the stator pole pieces placed half the distance apart in a circumferential direction as compared with the rotor pole pieces 142. As previously stated above, the widened heads 137 of the rotor pole pieces 142 are substantially twice the width of the stator pole piece heads 149, so that at certain times each rotor pole piece head 137 overlaps two stator pole piece heads 149. In the example shown and described herein, the rotor 120 has ten pole pieces 142 and the stator 114 twenty pole pieces 144 and 146. Accordingly, the rotation of the rotor 120 for each incremental step caused by each electrical pulse received will be one-twentieth of 360° or 18°, so that in the example shown and described herein, twenty direct current pulses will move the rotor 120 exactly one revolution as described below. If the pulses arrive within a certain time interval, for example 1 pulse every 3 seconds for a period of 1 minute, the rotor 120 which thus receives 20 pulses will turn one revolution per minute through the 20 steps thus performed. If, on the other hand, the pulses are received at a different rate, for example, the rate of 60 per second, the rotor 12 will turn 180 revolutions per minute, and if they are received at the rate of 400 per second, the rotor 120 will turn 1200 revolutions per minute.

In particular, (FIGS. 8, 12, 16 and 20) when both adjacent pole pieces 144 and 146 of each pair of stator pole pieces of the set 143 and the set 145 are energized, the rotor 120 advances one-half step to a location between them (FIG. 9). When, thereafter, the rearward or trailing stator pole piece 146 of each pair of stator pole pieces 144 and 146 is deenergized, the rotor 120 advances another half-step in the same direction into registry with the forward or leading pole piece 144 of each pair 144 and 146 (FIG. 11).

HALF-WAVE UNIDIRECTIONAL STEPPING MOTOR ENERGIZATION AND CONTROL CIRCUIT

The half-wave stepping motor energization and control circuit 18 shown in FIG. 5 controls the energization of both sets of windings 143 and 145 of the stator pole pieces 144 and 146 of the stepping motor 14 by supplying it with rectified half-wave direct current from an alternating current source in order to cause the rotor 120 thereof to rotate step-by-step in a clockwise direction in response to a command in the form of a positive electrical trigger pulse received from a suitable command device. Such a command device, for example, may consist of a probe arranged to trace a contoured surface and issue its commands directly in accordance with the contour variation of that surface, as shown in the Fengler Pat. No. 3,032,881 issued May 8, 1962 for Contour Reproducing Apparatus. Such a device may also consist of an electro-optical photoelectric line follower scanning the lines of a drawing to produce a magnetic tape for controlling the actuation of a machine tool indirectly from a magnetic tape recorded, as shown for example in the Fengler Pat. No. 3,178,717 issued Apr. 13, 1965 for Method and Apparatus for Producing Machine-Tool-Controlling Magnetic Tapes Directly from Drawings. Such a magnetic-tape-controlled machine tool system is shown, for example, in the Fengler Pat. No. 3,230,836 issued Jan. 25, 1966 for Analog Magnetic Tape-Controlled Machine.

The half-wave stepping motor energization and control circuit 18 is shown in FIG. 5 as applied to Unidirectional clockwise rotation of the rotor 120. It includes a positive trigger pulse input line 148 connected to a diode 152. The diode 152 is adapted to transmit a positive trigger pulse arriving along the line 148 to an input line 156 leading to the clockwise network, which is a pulse steering circuit, and to block the passage of negative or counterclockwise pulses thereto.

When bidirectional rotation or reversal of the rotor 120 is desired, as for both clockwise and counterclockwise rotation, a memory or sequencing and inverter subcircuit 270 (FIG. 23) is provided, together with a counterclockwise network including the logic circuits necessary to reverse the rotation of the rotor 120 in response to the receipt of a negative electrical pulse on the same signal pulse input line 148, or on two separate input lines. Description of the bidirectional or reversible rotation arrangement follows the description herein of the unidirectional rotation arrangement.

The positive signal or trigger pulse input line for the trigger pulses which control the clockwise rotation of the rotor 120 (FIG. 5) leads directly to a main binary flip-flop 160. This flip-flop 160 is bistable and, when triggered by a positive signal pulse, directs electric current from its own power current source (not shown) to either of two separate outputs which in turn lead to two subsidiary binary flip-flops 162 and 164. These are alternately triggered to deliver electric current similarly alternately to either of their outputs in response to the action of the main flip-flop 160. The outputs of the subsidiary flip-flops 162 are alternately connected to two NOR logic modules 172 and 174 which in turn are connected to the gates of paired silicon-controlled rectifiers 176, 178 and 180, 182 respectively, these being cross-connected but only alternately conducting in pairs. The outputs of the subsidiary flip-flop subcircuit 164 are similarly connected alternately to two NOR logic modules 184 and 186 which in turn are connected to the gates of paired silicon-controlled rectifiers 188, 190 and 192, 194 respectively, also only alternately conducting in pairs. The windings 147 of the stator pole piece 144 of the first set 143 thereof are connected between cross-connection lines leading from the rectifiers 176 and 180 to the rectifiers 182 and 178 respectively. The windings 151 of stator pole pieces 146 of the second set 145 thereof are similarly connected between cross-connection lines leading from the rectifiers 188 and 192 to the rectifiers 194 and 190 respectively. By reason of the simpler arrangement required, it is preferred that alternating current to be supplied to the silicon-controlled rectifiers just mentioned, such as from the alternating current power supply source 20. Although direct current could optionally be supplied from a direct current power supply source (not shown), it requires the addition of booster devices to extinguish the silicon-controlled rectifiers.

It will subsequently be shown below that when the gate of the silicon-controlled rectifier 178 is triggered by the output from the flip-flop 162, half-wave current flows from the rectifier 178 to the windings 147 of the first set 143 of stator pole pieces 144 in succession and returns to the silicon-controlled rectifier 176, the gate of which has also been triggered by the flip-flop 162 at the same time, and thence back to the alternating current source 20.

In the half-wave operation of the stepping motor 14 for unidirectional rotation only of the rotor 120 thereof, as shown in FIG. 9 and in the progressive paired diagrammatic fragmentary views and circuit energization diagrams FIGS. 6 to 21), let it be assumed that the windings 141 of the rotor pole pieces 142 have been energized from the direct current power source 140 to produce alternate north and south pole respectively in the rotor 120. Before entering into the details of energization as described below in connection with the operation of the stepping motor energization and control circuit 18 shown in FIG. 5, it may be stated here that when the first set 143 of stator pole pieces 144 is energized, the rotor 120 rotates until the north pole pieces 144 is energized, the rotor 120 rotates until the north pole pieces N of its pole pieces 142 lock onto an adjacent south pole piece 144 of the first set 143 of stator pole pieces. The rotor 129 under this condition remains stationary temporarily in this position and considerable force is necessary to rotate it further. If, now, the second set 145 of stator pole pieces 146 is energized, the rotor pole pieces 142 are attracted to the adjacent pole pieces 146 of opposite polarity and will move in a clockwise direction in response to the reception of positive trigger pulses at the diode 152 from the input line 148 leading thereto from the command device (not shown). The flow of direct current through the windings 147 and 151 of both sets 143 and 145 of pole pieces 144 and 146 of the stator 114 is controlled through an arrangement of four pairs of silicon-controlled rectifiers, having their gates controlled by flip-flops and NOR logic modules (FIG. 5). When this energization circuit 18 has energized the second set 145 of the stator pole pieces 146, it deenergizes the first set 143 thereof and vice versa.

In operation, let it be assumed that a first positive pulse, for example from a tape recorder, arrives along the signal pulse input line 148 at the diode 152 which passes it onward along the line 156 to the main flip-flop 160 while blocking the passage of negative signal pulses thereto. The arrival of this positive trigger pulse energizes the flip-flops 160 and 162 and causes their outputs to energize the gates of the pair of silicon-controlled rectifiers 180 and 182 so that they conduct current to the first set of stator pole pieces 143, but in the opposite direction to the direction of their previous energization thereby, reversing their polarities. This action deenergizes the second set of stator pole pieces 145 in response to the action of the NOR module 184 interrupting the flow of current to the gates of the pair of silicon-controlled rectifiers 188 and 190. The arrival of the next positive trigger pulse causes reversal of the flip-flops 160 and 164 so as to energize the gates of the pair of silicon-controlled rectifiers 192 and 194 which in turn now conduct the half-wave current to the second set of stator pole pieces 145 but in the opposite direction to their previous energization, thereby reversing their polarities, whereupon the first set of stator pole pieces 143 is deenergized in response to the action of the NOR module 174 interrupting the flow of current to the gates of the previously energized pair of silicon-controlled rectifiers 180 and 182. The rotor 120 thus turns clockwise one step at a time for each such positive trigger pulse. Such pulses may be either square or sinusoidal waves, and their frequency of reception controls the speed of the stepping motor 14.

The arrival of still another positive trigger pulse by way of the pulse input line 148 causes the main flip-flop 160 to switch its output from the secondary flip-flop 164 to the secondary flip-flop 162, which in turn switches its output from the gates of the pair of silicon-controlled rectifiers 180 and 182 to the gates of the pair of silicon-controlled rectifiers 176 and 178, causing them to rectify and conduct half-wave direct power current from the alternating current power source 20 until they are extinguished. The output of the flip-flop 162 also causes the NOR module 186 to interrupt the output of flip-flop 164, shutting off the silicon-controlled rectifiers 192 and 194. The current of silicon-controlled rectifiers 176 and 178 energizes the windings 147 of the first set 143 of stator pole pieces 144, whereupon the rotor 120, whose alternate north and south pole pieces 142 are energized from the direct current power source 140, rotates until all of its north and south poles of the first set 143 of stator pole pieces 144 to reach the positions shown in FIGS. 3 and 7, with the energized portion of the circuit 18 shown in simplified form in FIG. 6.

If next another positive trigger pulse arrives at the diode 152 and is again transmitted by way of the line 156 to the flip-flop 160, the latter now changes its output from the flip-flop 162 to the flip-flop 164, causing this flip-flop 164 to change its output from the gates of the pair of silicon-controlled rectifiers 192 and 194 to the gates of the pair of silicon-controlled rectifiers 188 and 190, causing them to rectify and conduct current from the source 20 to energize the windings 151 of the second set 145 of stator pole pieces 146. This action causes the widened heads 137 of the rotor poles 142 to move clockwise to span adjacent pairs of the narrower heads 149 of the stator pole pieces 144 and 146 of the first and second sets 143 and 145 having the same polarity but of opposite polarity to the rotor pole pieces 142. The parts have now reached the relative positions shown in FIG. 9, with the energized portion of the circuit 18 shown in FIG. 12. The output of the flip-flop 164 at the same time energizes, through a delay line, the NOR module 172, thereby interrupting the gate current to the pair of silicon-controlled rectifiers 176 and 178 and extinguishing these. The delayed timing, which was indicated by the word "-delayed" in FIG. 8, is such that the pair of silicon-controlled rectifiers 176 and 178 are extinguished so as to deenergize the windings 147 of the first set 143 of stator pole pieces 144 only after the pair of silicon-controlled rectifiers 188 and 190 have become fully conducting. The heads 137 of the rotor pole pieces 142 then realign themselves fully with the heads 149 of the second set 145 of stator pole pieces 146, thereby completing the first clockwise incremental step of the rotor 120. The pair of silicon-controlled rectifiers 188 and 190 continue to rectify and conduct power current to the second set 145 of stator pole pieces 146 until they are extinguished. The parts now have reached the relative positions shown in FIG. 11 with the now-energized portion of the circuit 18 shown in simplified form in FIG. 10.

If, now, still another positive pulse arrives at the diode 152 and is transmitted to the flip-flop 160, the flip-flop 160 changes its output from the flip-flop 164 to the flip-flop 162. The output of the flip-flop 162 now changes over (FIG. 12) and energizes the gates of the pair of silicon-controlled rectifiers 180 and 182, causing them to rectify and conduct half-wave current from the source 20 to the windings 147 of the first set 143 of stator pole pieces 144. The rotor 120 now moves clockwise as before (FIG. 13) with the widened heads 137 of the rotor pole pieces 142 again momentarily spanning the pairs of stator pole pieces 144 and 146 of both sets 143 and 145 thereof.

The same energizing current also goes through the delay line to the NOR module 184 again indicated by a horizontal arrow (FIG. 12) but in the opposite direction, and the third pair of silicon-controlled rectifiers 188 and 190 is extinguished, thereby deenergizing the windings 151 of all of the second set 145 of stator pole pieces 146, with the circuit now in the condition shown in FIG. 14. The heads 137 of the rotor pole pieces 142 now realign themselves fully with the heads 149 of the first set 143 of stator pole pieces 144 (FIG. 14), thus completing another clockwise incremental step, as shown in FIG. 15.

Figure 17:
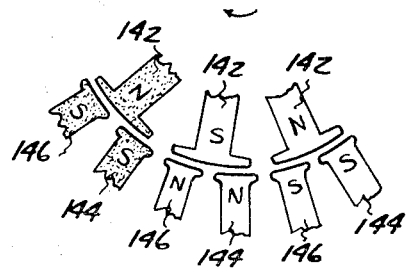
Figure 16:
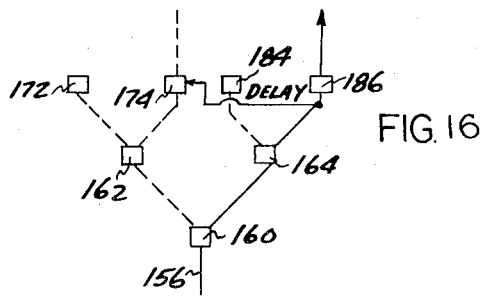
Figure 19:
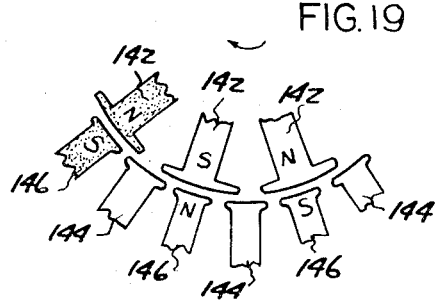
Figure 18:
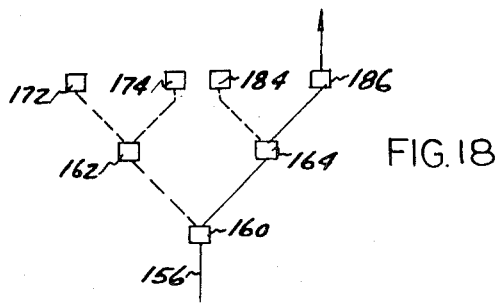
Figure 21:
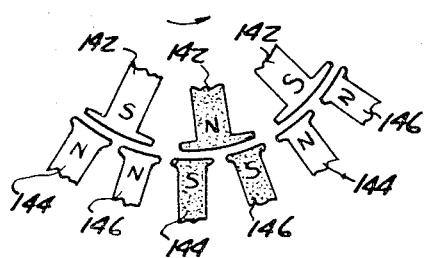
Figure 20:
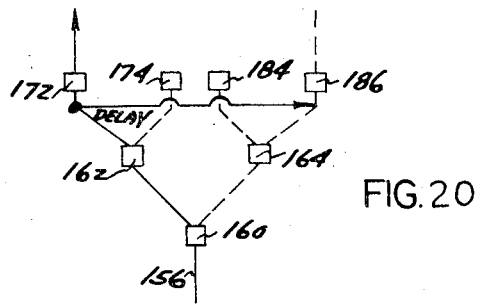

If, as before, still another positive pulse arrives at the diode 152 and is again transmitted to the flip-flop 160, the latter changes its output from the flip-flop 162 to the flip-flop 164. The output of the flip-flop 164 now changes over (FIG. 16), corresponding to this positive pulse to the gates of the pair of silicon-controlled rectifiers 192 and 194, causing them to rectify and conduct half-wave current from the power current source 20 to the windings 151 of the second set 145 of stator pole pieces 146. In response to this, the widened heads 137 of the rotor pole pieces 142 again move clockwise to span the adjacent pairs of pole pieces 144 and 146 of both sets 143 and 145 (FIG. 17). The pair of silicon-controlled rectifiers 180 and 182 remains conducting until, due to the time delay, indicated by the horizontal arrow in FIG. 16, the gate current energizes the NOR module 174, which interrupts the gate current to the silicon-controlled rectifiers 180 and 182. This action deenergizes the windings 147 of the first set 143 of stator pole pieces 144 (FIG. 18) but leaves the windings 151 of the stator pole pieces 146 of the second set 145 still energized by the pair of silicon-controlled rectifiers 192 and 194. As a result of such energization, the pole pieces 142 of the rotor 120 again move clockwise to realign themselves fully with the second set 145 of stator pole pieces 146 (FIG. 19), thus completing still another incremental step in a clockwise direction.

If, finally, yet another positive pulse arrives at the diode 152 and is again transmitted to the flip-flop 160, the latter's output changes from the flip-flop 164 to the flip-flop 162 (FIG. 20), this time directing its output to the gates of the pair of silicon-controlled rectifiers 176 and 178, causing them to rectify and conduct half-wave current from the power current source 20 to the windings 147 of the first set 143 of stator pole pieces 144. As a consequence, the widened heads 137 of the rotor pole pieces 142 again momentarily span the heads 149 of the pairs of adjacent stator pole pieces 144 and 146 of the same polarity in both sets 143 and 145 thereof. The pair of silicon-controlled rectifiers 192 and 194 remains momentarily conducting until, due to the time delay indicated by the horizontal arrow in FIG. 20, the gate current energizes the NOR module 186, which interrupts the gate current to the pair of silicon-controlled rectifiers 192 and 194. This action extinguishes the pair of silicon-controlled rectifiers 192 and 194 and therefore deenergizes the windings 151 of the second set 145 of stator pole pieces 146, leaving the windings 147 of the first set 143 of stator pole pieces 144 still energized by the pair of silicon-controlled rectifiers 176 and 178. In response to this, the widened heads 137 of the pole pieces 142 of the rotor 120 again move clockwise to align themselves fully with the heads 149 of the first set 143 of stator pole pieces 144, thus completing yet another incremental step of the rotor 120 in a clockwise direction. If, in this manner, positive pulses continue to arrive, the rotor 120, after having completed twenty incremental steps in a clockwise direction, will have rotated exactly one revolution. This in turn will have effected one complete revolution of the shaft 16 and worm 24, thereby rotating the worm gear 26 and nut 90 so as to move the screw shaft 94 in one direction.

Where the shutoff is delayed, as described above, it is accomplished by using a "lumped-constant delay line" (not shown). Lumped--constant delay lines are conventional and are constructed of inductors and capacitors in a series of cascaded low-pass filters and are used in computers to delay the carry in a serial binary adder and for matching unintentional delays due to circuit capacitance.

The halting of the rotor pole pieces 142 in their intermediate or spanning positions with their heads 137 overlapping the heads 149 of both sets of stator pole pieces 144 and 146 (FIGS. 9, 13, 17 and 21) occurs only for an instant. The purpose of this is to start the rotation of the rotor 120 in the proper direction and prevent it from rotating backward when subjected to successive positive signal pulses, as well as to give increased torque to the rotor 120. Thus, when both pole pieces 144 and 146 of each pair of pole pieces of the two sets 143 and 145 of stator pole pieces are energized, the adjacent pole piece 142 of the rotor 120 advances one-half step to a point between them. The subsequent deenergization of the rearward pole piece of the pair then causes the rotor pole piece 142 to advance another half-step into registry or alignment with the forward pole piece of the pair, the terms "rearward" and "forward" being used with reference to the direction of rotation being imparted to the rotor 120.

It will be evident to those skilled in the electronic and logic module art that the NOR modules 172, 174, 184 and 186 in the circuit 18 of FIG. 5 can be replaced by normally-closed reed switches (not shown) which, when energized, also interrupt the current flowing to the gates of their respective silicon-controlled rectifiers 176—178, 180—182, 188—190 and 192—194.

MODIFIED HALF-WAVE STEPPING MOTOR CIRCUIT USING "AND" LOGIC MODULES

The modified half-wave stepping motor energization circuit, generally designated 200, shown in FIG. 24, is generally similar, particularly in its upper and lower portions, to the half-wave energization circuit 18 of FIG. 5, but differs in its middle portion. Accordingly, the same numerals have been used for corresponding elements in the upper and lower portions of FIG. 24 as in FIG. 5, with different numerals employed for the different elements located in the middle portion of FIG. 24. In particular, each "NOR" module 172, 174, 184 and 186 is replaced by an AND module 202, 204, 206 and 208 respectively. An "AND" module emits an output only when both of its inputs are energized and not otherwise. The outputs of the subsidiary flip-flops 162 and 164, instead of being directly connected to their respective NOR modules 172, 174, 184 and 186 as in FIG. 5 have one output of each such subsidiary flip-flop 162 and 164 connected directly to one input of the AND modules 202, 204, 206 and 208. The other output of each of the pair of subsidiary binary flip-flops 162 and 164 is connected to one input of each of four dual-input auxiliary flip-flops 210, 212, 214 and 216 respectively in the manner shown in FIG. 24. One output of each of these auxiliary flip-flops is connected to the remaining input of its respective AND module, while the second or remaining output of each subsidiary flip-flop 210, 212, 214 or 216 is unconnected or "dead". The outputs of the four AND modules 202, 204, 206 and 208 are connected respectively to the gates of the paired silicon-controlled rectifiers 176—178, 180—182, 188—190 and 192—194.

The operation of the modified half-wave unidirectional energization circuit 200 of FIG. 24 resembles that described above for the circuit 18 of FIG. 5, and hence needs not be described in detail. It is believed sufficient to state that each AND module 202, 204, 206 or 208 is "steered" to "off" and "on" positions through the operation of its respective auxiliary flip-flop 210, 212, 214 or 216. Since one input of each auxiliary flip-flop 210, 212, 214 or 216 is connected to a gate circuit of the paired half-wave rectifiers 176—178, 180—182, 188—190 and 192—194 in the same manner as the NOR modules 172, 174, 184 and 186 of FIG. 5 in order to interrupt the flow of signal pulses to the gates of the said paired silicon-controlled rectifiers, each gate circuit in an ascending order shuts off the preceding gate circuit. The second input to these auxiliary flip-flops 210, 212, 214 and 216 which permits signal pulses to pass through to the silicon-controlled rectifiers will be seen from FIG. 24 to be always connected to the descending numbered gate circuit. This arrangement in the modified circuit 200 of the interrupting AND logic modules provides, therefore, a "fail-safe" control of the firing order of the silicon-controlled rectifier gate circuits.

To employ a hydraulic analogy, the energization circuit 200 employs each AND logic module 202, 204, 206 or 208 and its respective auxiliary flip-flop 210, 212, 214 or 216 as a "faucet" which can be locked "on" so that it will pass signal pulses from the binary flip-flops 162 and 164 to the gates of the respective silicon-controlled rectifier, or locked "off", so that the signal pulses are interrupted to the gates and consequently shutoff their respective silicon-controlled rectifiers.

FULL-WAVE STEPPING MOTOR ENERGIZATION AND CONTROL CIRCUIT

The full-wave stepping motor energization and control circuit, generally designated 220 and shown in FIG. 22, as its name indicates, supplies full-wave rectified current from the alternating current source 20 to the stepping motor 14 instead of the half-wave current supplied thereto by the half-wave circuit 10 of FIGS. 5 to 21 inclusive. The full-wave circuit 220 has the advantage over the half-wave circuit 18 of obtaining higher torque and consequently greater power and faster response from the stepping motor 14. This has important uses, for example, in operating the various carriages or tool holders in timed relationship in heavy duty machine tools.

From a comparison of the circuit 18 and 220 of FIGS. 5 and 22 respectively, a certain similarity will be apparent. In order to show this relationship between these two circuits, like components or subcircuits of the full-wave circuit 220 of FIG. 22 have been designated with the same reference numerals as those in FIG. 5 increased by 100. Thus, the signal pulse input line 148 of FIG. 5 becomes 248 in FIG. 22 and the diode 152 of FIG. 5 becomes 252 in FIG. 22, with a sequencing and inverter subcircuit 270 added for reversal of the direction of rotation of the rotor 120. In the same manner, the flip-flops 160, 162, 164 of FIG. 5 become 260, 262 and 264 in FIG. 22, and the NOR modules 172, 174, 184 and 186 of FIG. 5 become 272, 274, 284 and 286 in FIG. 22. A negative-pulse-transmitting diode 254 has been added, however, with an input line 258 leading to the sequencing and inverter subcircuit or module 270. The latter is shown in more detail in FIG. 23, which will subsequently be described below.

In the same manner, the pairs of silicon-controlled rectifiers 176—178, 180—182, 188—190 and 192—194 respectively of FIG. 5 become 276—278, 280—282, 288—290 and 292—294. The order of energization of "firing" for the clockwise rotation of the rotor 120 remains the same in both FIGS. 5 and 22. However, while the half-wave circuit 18 of FIG. 5 employs four pairs of silicon-controlled rectifiers operating in the same direction, as indicated by their arrow heads, the full-wave circuit 220 of FIG. 22 employs four additional pairs of such rectifiers operating in the opposite direction, namely the oppositely acting pairs of silicon-controlled rectifiers 376, 378, 380, 382, 388—390 and 392—394. Thus, the circuit 220 of FIG. 22 may be said to contain four sets of silicon-controlled rectifiers, each set containing two pairs of such rectifiers operating in opposite directions. The circuit 220 of FIG. 22 also contains two single-pole double-throw reed switches 302 and 304 and two double-pole double-throw reed switches 306 and 308 connected as shown therein.

BIDIRECTIONAL STEPPING MOTOR OPERATION UNDER FULL-WAVE ENERGIZATION

For clockwise or unidirectional rotation of the rotor 120, the operation of the stepping motor 14 under the full-wave energization and control circuit 220 generally resembles that of the half-wave circuit 18 just described, and differs only in detail. It is therefore deemed unnecessary to describe the full-wave operation step-by-step, as was done above with respect to the half-wave operation, nor to supply step-by-step energization diagrams. Accordingly, the operation will first be described solely for clockwise rotation with respect to FIG.

22. It will be understood that in FIG. 22, four silicon-controlled rectifiers are energized by certain of the flip-flops 260–262–64 when these are triggered by the arriving pulse, instead of only two such rectifiers at any particular time, as was the case in FIG. 5. It will also be understood that both plus and minus half-wave direct current flows through the two pairs of each set in opposite directions to energize the stator pole windings 147 or 151 by flowing through these windings in the same direction. It will be further understood that the "-firing" order of the silicon-controlled rectifier sets is the same as with the pairs before, namely 1–2–3–4 for clockwise rotation of the rotor 120. It will be shown below that this firing order becomes 4–3–2–1 for counterclockwise rotation of the rotor 120.

Let it be assumed at the outset that the last two signal pulses received along the input lines 248 and 258 were positive and that the last positive pulse caused the flip-flops 260 and 264 to energize the set of silicon-controlled rectifiers 292, 294, 392, 394 so as to have moved the pole of the rotor 120 corresponding to that shown in FIG. 7 to a 5o'clock starting position, namely a step to the right of that shown in FIG. 3. Let it now be assumed that a new positive signal pulse arrives along the signal pulse input line 248 and is blocked by the diode 254 but passes through the diode 252 to the sequencing and inverter subcircuit 270. The latter "remembers" that the positive pulse is of the same polarity as the pulse immediately preceding it, and, therefore, does not change the NOR module circuits through the reed switches 306 and 308 in the manner subsequently described below for negative signal pulse operation. The newly arriving positive pulse in the line 248 therefore bypasses the sequencing and inverter subcircuit 270 which will be described more fully below with particular reference to FIG. 23, and goes directly to the main flip-flop 260, causing its output to change over from its previous position energizing the flip-flop 264 to that energizing the flip-flop 262. The latter in turn causes its output to change over from its previous position energizing the set of silicon-controlled rectifiers 280, 282, 380, 382 to pass its output current through the first NOR module 272 to the gates of the set of silicon-controlled rectifiers 276, 278, 376, 378, allowing these to rectify and conduct current from the alternating current power source 20 to the first set of stator pole windings 147.

The silicon-controlled rectifier 378 passes the negative half-cycle from the alternating current power source 20 to the stator pole windings 147, causing the first set 143 of stator pole pieces 144 to be magnetized. This action causes the rotor 120 to turn one-half step clockwise, because the stator pole piece 144 of the first set 143 at 6 o'clock is now a south pole. At the same time, the current of the first gate circuit passes, slightly delayed, from the flip-flop 262 through the double-pole double-throw reed switch 308 to the fourth NOR module 286 which in turn shuts off flip-flop current flow to the gates of the silicon-controlled rectifier set 292, 294, 392, 394. This action deenergizes the holding stator pole pieces 146 of the second stator pole set 145, thereby causing the rotor 120 to complete its first clockwise step. As before, the north poles of the rotor 120 align themselves with the south poles 144 of the first stator set and vice versa.

Under these circumstances, when the gates of the set of silicon-controlled rectifiers 276, 278, 376, 378 are energized (FIG. 22) from the output of the flip-flop 262, the silicon-controlled rectifier 278 conducts the negative half-wave current from right to left through the first set of stator pole windings 147, thence through the silicon-controlled rectifier 276 back to the power source 20. The other negative half-wave is conducted to the stator pole windings 147 through the silicon-controlled rectifier 378, returning through the silicon-controlled rectifier 376 to the power source 20. Both circuits thus energize the first set of stator pole pieces 144 to the same polarity, and any current flowing in the opposite direction is halted through the blocking action of the respective silicon-controlled rectifiers.

When the next positive signal pulse or trigger pulse arrives along the input line 248 and passes through the diode 252 (being blocked by the diode 254 from passing onward to the line 258) it again bypasses the sequencing and inverter subcircuit 270, and triggers the flip-flop 260, which has now changed over, to emit output current, thereby causing the flip-flop 264 to energize the gates of the set of silicon-controlled rectifiers 288, 290, 388, 390, whereupon the negative half-wave passes therethrough to the windings 151 of the second set of stator pole pieces 146, energizing these pole pieces with the same polarity as the first set of stator pole pieces 144. This action rotates the rotor 120 one-half step clockwise into the pole-spanning position of FIG. 9.

Meanwhile, the same gate circuit energization current flows, slightly delayed, through the double-pole, double-throw reed switch 306 to the first NOR module 272, which shuts off all gates of the set of silicon-controlled rectifiers 276, 278, 376, 378. In response to this action, the holding poles 144 of the first set of stator pole pieces are deenergized, whereupon the rotor 120 now completes its second step clockwise with the rotor south poles held aligned with the stator north poles until the next signal or trigger pulse causes the flip-flops to change the respective NOR logic module.

If, now, another positive signal or trigger pulse arrives along the signal input line 248 and passes through the diode 252, it again bypasses the sequencing and inverter subcircuit 270 and causes the first flip-flop 260 to change over and emit output current to energize the second flip-flop 262 and thereby energize the gates of the set of silicon-controlled rectifiers 280, 282, 380, 382. These again supply negative and positive rectified half-wave current to the first set of stator pole windings 147 but in a direction from left to right, causing another half-step clockwise rotation of the rotor 120.

The arrival of still another positive signal or trigger pulse along the signal input line 248 again bypasses the sequencing and subcircuit 270 and triggers the first flip-flop 260 to change over and energize the third flip-flop 264. The latter passes the flip-flop output current on to the gates of the set of silicon-controlled rectifiers 292, 294, 392, 394, which thereby energize the second set of stator pole pieces 146 from left to right by causing rectified half-wave current to flow from the alternating current power source 20 in opposite directions thereto. This again causes a half-step clockwise rotation of the rotor 120.

Summing up clockwise operation of the stepping motor 14, the successive positive signal or trigger pulses arriving along the input line 248 through the diode 252 have successively bypassed the sequencing and inverter subcircuit 270 and have therefore caused the flip-flops 260 and 262 or 264 to effect the completion of four steps of the rotor 120 in a clockwise direction. Such clockwise rotation continues to occur as long as positive trigger pulses arrive through the input line 248 and diode 252 and are "remembered" as such by the sequencing and inverter subcircuit 270. As before, the number of signal or trigger pulses required to effect one complete revolution of the rotor 120 equals the number of poles 144 and 146 of the stator 114, which has twice as many poles as the rotor 120.

SEQUENCING, MEMORY AND INVERTER SUBCIRCUIT

The sequencing, memory and inverter subcircuit 270 (FIG. 22) which controls the direction of rotation and reversal of the rotor 120 so as to be clockwise in response to the reception of positive signal pulses and counterclockwise for negative signal pulses, is shown in more detail in FIG. 23. The sections of the subcircuit 270 to the left and right respectively of the signal pulse input line 248 may be referred to, for convenience, as the clockwise-rotation and counterclockwise-rotation sections of the circuit respectively, with reference to the directions of rotation of the rotor 120 which they control.

Considering first the clockwise-rotation or left-hand section of FIG. 23, a positive signal or trigger pulse arriving along the signal pulse input line 248 is blocked by the negative-pulsetransmitting diode 254 but is transmitted by the positive-pulse-transmitting diode 252 to the input of a normally-closed bidirectional reed switch 400. In the deenergized condition of the reed switch 400 (FIG. 23), its output passes the positive signal pulse onward to one input of a first clockwise binary counter 402, one output of which leads by way of a capacitor and isolation diode shift circuit 403 to one input of a second clockwise binary counter 404, in series with the first counter 402. The "live" output of the second clockwise binary counter 404 conducts the positive signal pulse to the input of a clockwise one-shot module 406 and also to the operating coil of the reed switch 400, the other output of the second clockwise binary counter 404 being "dead".

In a similar manner, a negative signal pulse arriving along the signal pulse input line 248 is blocked by the positive-pulse-transmitting diode 252 but is transmitted by the negative-pulse-transmitting diode 254 to the input of an inverter 408. The latter changes the polarity of the negative pulse to positive and passes this positive pulse onward to the input of a normally-closed bidirectional reed switch 410 similar to the reed switch 400. The reed switch 410 in its deenergized condition (FIG. 23) passes the now-positive signal pulse onward to one input of a first counterclockwise binary counter 412, the other input of which is connected to a second output of the first clockwise binary counter 402 and also by way of a capacitor and diode shift circuit 413 to a second input of a second counterclockwise binary counter 414, the first input of which is connected to the first output of the first counterclockwise binary counter 412 so as to place the counter 414 in series with the counter 412. The "live" output of the second counterclockwise binary counter 414 is connected to the input of a counterclockwise one-shot module 416 and also to the operating coil of the reed switch 410, the other output being "dead".

A second output of the first clockwise binary counter 402 is connected to one input of a latch module 418, the other input of which is connected by way of a second output of the first counterclockwise binary counter 412 to a second input of each of the clockwise binary counters 402 and 404, the third inputs of which are "dead". The second output of the first clockwise binary counter 402 is likewise connected to a second input of each of the first and second counterclockwise binary counters 412 and 414, the third inputs of which are "dead".

The outputs of the clockwise and counterclockwise one-shot modules 406 and 416 (FIG. 23) are connected to one another and also to the inputs of the two interrupting single pole reed switches 302 and 304. The alternate pole of each of the normally closed bidirectional reed switches 400 and 410 in the energized condition thereof is connected to the input of the first flip-flop 260, whereas the output of the latch module 418 is connected to the second input of each of the reed switches 306 and 308, the outputs of which are connected to the NOR modules 272—274 and 284—286 respectively (FIG. 22).

In the operation of the sequencing and inverter subcircuit 270 in effecting counterclockwise rotation of the rotor 120, so as to render it reversible, in contrast to the unidirectional rotation thereof by solely positive pulses previously dealt with, let it now be assumed that a first negative signal pulse arrives along the signal input line 248. As this first negative signal pulse is blocked by the positive-pulse-passing diode 252, it consequently interrupts and halts the previously-occurring clockwise stepping of the rotor 120, as described above. Assuming that the arrival of the last positive signal pulse brought about the last clockwise step which in turn rotated the rotor 120 to the fourth step in the cycle of steps by energizing the gates of the set of silicon-controlled rectifiers 292—294, 392—394, this newly arriving negative signal pulse, which has been blocked by the diode 252, is transmitted by the diode 254 to the input of the inverter 408 which converts it to a positive pulse and passes it along to one input of the first counterclockwise binary counter 412 by way of the normally-closed presently deenergized reed switch 410 (FIG. 23). Thereupon the second output of the first binary counter 412 resets to zero the first and second clockwise binary counters 402 and 404 and energizes and shifts the latch module 418 to its "On" position, which remains "on" until subsequently interrupted. The output of this latch module 418 in its "on" position energizes and shifts the double-throw reed switches 306 and 308 (FIG. 22) to their opposite positions whereby they connect the gates of the set of silicon-controlled rectifiers 276, 278, 376, 378 to the second NOR module 284, also the gates of the set of rectifiers 288, 290, 388, 390 to the third NOR module 274, also the gates of the set of rectifiers 280, 282, 380, 382 to the fourth NOR module 286 and finally the gates of the set of rectifiers 292, 294, 392, 394 to the first NOR module 272. This action reverses the direction of rotation of the rotor 120 from clockwise to counterclockwise rotation.

As stated above, it has been assumed that the rotor 120 has been holding in response to the energization of the gates of the set of silicon-controlled rectifiers 292, 294, 392, 394, such energization of the gates of this set of rectifiers having previously interrupted the third NOR module 274, whereupon the reed switch 306 now shifts from interruption of the third NOR module 274 to that of the first NOR module 272. This action energizes the gates of the set of silicon-controlled rectifiers 280, 282, 380, 382 from their previously switched-off condition, so that the said set gate circuit is free to cause the rotor pole pieces 142 to rotate one-half step in a counterclockwise direction into registry with the second set of stator pole pieces 146. Due to the delayed switching action of the fourth NOR module 286, the above-mentioned energization of the gate circuit of the set of silicon-controlled rectifiers 280, 282, 380, 382 causes interruption of the above-mentioned holding circuit of the rotor 120 and thus permits it to rotate counterclockwise one-half step, namely through the second half-step of the first full counterclockwise step.

Let it next be assumed that a second negative trigger or signal pulse arrives along the signal input line 248 and is blocked by the diode 252 but transmitted through the diode 254, converted to a positive pulse by the inverter 408 (FIG. 23) and again passed through the presently deenergized counterclockwise double-pole double reed switch 410 to the first counterclockwise binary counter 412 which thereupon shifts over and transfers its output to the second counterclockwise binary counter 414, the output of which goes to the counterclockwise one-shot module 416 as well as to energize the reed switch 410. When thus energized, the counterclockwise one-shot module 416 emits an output which briefly energizes the normally-closed single-pole reed switches 302 and 304. This action opens the circuit in the connection from the first flip-flop 260 to the second and third flip-flops 262 and 264. The flip-flop 262 or 264 which was last energized by the first or main flip-flop 260 through the break thus made in its circuit by the action of the reed switch 302 or 304 now changes over to its other position, thereby reversing its action from directing clockwise rotation to directing counterclockwise rotation.

Meanwhile, through the momentary interruption of the output current coming from the first or main flip-flop 260 to the third flip-flop 264 by the shifting of the reed switch 304, this third flip-flop shifts to its opposite position, thereby ceasing to energize the gate circuit of the set of silicon-controlled rectifiers 292, 294, 392, 394, and starting to energize the gate circuit of the set of silicon-controlled rectifiers 288, 290, 388, 390 which now also has current flowing through the first double-pole double-throw reed switch 306 so as to interrupt the current flowing through the gate circuit of the set of silicon-controlled rectifiers 280, 282, 380, 382. As a result, the rotor 120 now completes its second step in a counterclockwise direction.

At the same time, the output of the second counterclockwise binary counter 414, in addition to energizing the counterclockwise one-shot module 416 also energizes the reed switch 410 and consequently interrupts its connection from the inverter 408 to the input of the first counterclockwise binary counter 412, and in its opposite position to which it is shifted by its energization, (FIG. 23), it connects the output of the inverter 408 directly to the input of the main flip-flop 260. Because the changing of the sequences from the clockwise direction to the counterclockwise direction of rotation of the rotor 120 now has been completed, all subsequent negative pulses received along the signal pulse input line 248, transmitted by the diode 254 and converted to positive trigger or signal pulses by the inverter 408, are transmitted directly through the left-hand position of the switch blade of the now-energized double-pole reed switch 410 to the input of the main flip-flop 260 without going to the counterclockwise binary counters 412 and 414 whose connection to the double-pole reed switch 410 has been interrupted by the shifting of the latter through its energization.

Let it now be assumed that a third negative trigger pulse arrives along the signal pulse input line 248 (FIG. 23), passes through the diode 254 to the memory-and-inverter subcircuit 270 and is therein converted by the inverter 408 to a positive pulse which now flows through the just-energized and shifted double-throw reed switch 410 directly to the first flip-flop 260. This in turn energizes the second flip-flop 262 (FIG. 22), causing it to change over from its previous position energizing the gate circuit of the set of silicon-controlled rectifiers 280, 282, 380, 382 to its opposite position energizing the gate circuit of the set of silicon-controlled rectifiers 276, 278, 376, 378 and terminating energization of the gate circuit of the set of silicon-controlled rectifiers 288, 290, 388, 390. This action causes the rotor 120 to complete its third step in a counterclockwise direction.

If, now, a fourth negative trigger pulse arrives at and passes through the diode 254 to the memory-and-inverter subcircuit 270, it is therein converted by the inverter 408 to a positive pulse which flows directly through the leftward-shifted double-throw reed switch 410 to energize the first flip-flop 260. The latter again changes over from energizing the second flip-flop 262 to energizing the third flip-flop 264, which in turn changes over to energize the gate circuit of the set of silicon-controlled rectifiers 292, 294, 392, 394, while at the same time blocking energization of the gate circuit of the set of silicon-controlled rectifiers 276, 278, 376, 378. This action causes the rotor 120 to complete its fourth step in a counterclockwise direction.

If, however, a positive trigger pulse now arrives at the sequencing-and-inverter subcircuit 270 through the diode 252 after being clocked by the diode 254, it flows through the unenergized double-throw reed switch 400 by way of its first clockwise binary counter 402 to the latch module 418, turning it to its "off" position and consequently deenergizing the reed switches 306 and 308. This action causes all connections to return to clockwise rotation while also causing the two counterclockwise binary counters 412 and 414 in the sequencing-and-inverter subcircuit 270 to be automatically reset to zero. This deenergization of the reed switches 306 and 308 causes them to return to their original positions wherein the energized gate circuit of the set of silicon-controlled rectifiers 276, 278, 376, 378, through delayed action, blocks the gate circuit of the silicon-controlled rectifier set 292, 294, 392, 394, the rectifier set 288, 290, 388, 390 blocks the rectifier set 276, 278, 376, 378 through delayed action, the rectifier set 280, 282, 380, 382 blocks the rectifier set 288, 290, 388, 390 through delayed action.

The last position of the rotor 120 was in counterclockwise rotation on the holding circuit of the rectifier gate circuit 292, 294, 392, 394, blocking the rectifier gate circuit 276, 278, 376, 378, but this deenergization of the reed switches 306 and 308 has now removed this block. Thereupon, the gate circuit of the silicon-controlled rectifier set 292, 294, 392, 394 blocks the gate circuit of the rectifier set 280, 282, 380, 382 thereof through the third NOR module 274. This action frees the gate circuit of the silicon-controlled rectifier set 276, 278, 376, 378 to conduct, so that the rotor 120 makes a half step in a clockwise direction. The gate circuit of the silicon-controlled rectifier set 276, 278, 376, 378 then blocks the gate circuit of the rectifier set 292, 294, 392, 394 thereof through the delayed action line, so that the rotor 120 then completes its first step in a clockwise direction.

In summation, the positions of the reed switches 306 and 308 determine the direction of stepping of the rotor 120. When these reed switches are deenergized, in response to the reception of positive signal pulses through the diode 252 and switch 400, the stepping rotation of the rotor 120 is clockwise, with control current passing in succession through the gate circuits of the silicon-controlled rectifier sets and thereafter repeating this sequence. When, on the other hand, the reed switches 306 and 308 are energized through the action of the sequencing-and-inverter subcircuit 270 in response to the reception of negative trigger pulses, through the diode 254, inverter 408 and switch 410, the stepping rotation of the rotor 120 is counterclockwise, with control current passing in succession through the gate circuits of the silicon-controlled rectifier sets and thereafter repeating this sequence. However, before the first, second and third flip-flops 260, 262 and 264 can operate in their normal order, the second or third flip-flop 262 or 264 (whichever operated last) must be and is reversed by the action of the NOR logic modules 272, 274, 284 and 286 and by the action of the sequencing-and-inverter subcircuit 270.

Thus, it has been seen from the foregoing description that it requires two successive pulses of the same polarity to reverse the direction of rotation of the rotor 120 from the rotation brought about by preceding pulses of opposite polarity. The first signal pulse of different polarity actuates the first binary counter on its side of the circuit and resets to zero the first and second binary counters on the opposite side of the circuit. The second such signal pulse actuates therethrough the second binary counter on the same side of the circuit and conditions the circuit for subsequent direct passage of subsequent like-polarity pulses directly.

I claim:

1. A linear high-torque electrical stepping motor, comprising:
    an elongated supporting structure,
    an elongated armature movably mounted in said supporting structure for linear motion relatively thereto and having multiple spaced armature pole pieces of alternate opposite polarities,
    and a stator mounted in said supporting structure in proximate relationship with said armature and having multiple stator pole pieces of at least twice the number of said armature pole pieces and arranged in first and second sets disposed in alternate sequence, with the pole pieces of each set having alternate opposite windings imparting alternate opposite polarities stator pole pieces of each set upon energization thereof.

2. A linear high-torque electrical stepping motor, according to claim 1, wherein said stator pole pieces are disposed in a linear path, and wherein said armature is slidably mounted in said supporting structure and has its pole pieces disposed in a linear path adjacent the stator pole pieces.

3. A linear high-torque electrical stepping motor, according to claim 2, wherein means is provided for selectively energizing said sets of stator pole pieces either singly or collectively.

4. A linear high-torque electrical stepping motor, according to claim 2, wherein said stator pole pieces have heads disposed closely adjacent one another, and wherein said armature pole pieces have widened heads of approximately twice the widths of said stator pole piece heads whereby a single armature pole piece head is capable of spanning a pair of adjacent stator pole piece heads.

5. A linear high-torque electrical stepping motor, according to claim 1, wherein means is provided for selectively energizing said sets of stator pole pieces either singly or collectively.